United States Patent [19]
Anderson

[11] Patent Number: 5,418,632
[45] Date of Patent: May 23, 1995

[54] SYSTEM AND METHOD FOR ROTATIONAL SCANNER BASED VOLUME DISPLAY

[75] Inventor: Douglas W. Anderson, Richardson, Tex.

[73] Assignee: Texas Instruments Incorporated, Dallas, Tex.

[21] Appl. No.: 184,321

[22] Filed: Jan. 21, 1994

[51] Int. Cl.6 .................. G02B 5/32; G02B 26/10; G02B 27/22
[52] U.S. Cl. ........................ 359/17; 359/18; 359/478
[58] Field of Search ............ 359/1, 17, 18, 478, 359/479, 462

[56] References Cited

U.S. PATENT DOCUMENTS

| | | | |
|---|---|---|---|
| 3,619,033 | 11/1971 | McMahon | 359/18 |
| 4,165,464 | 8/1979 | Ikeda et al. | 359/18 |
| 4,600,266 | 7/1986 | Omi | 359/18 |
| 4,678,263 | 7/1987 | Funato | 359/18 |
| 4,871,231 | 10/1989 | Garcia, Jr. | 359/478 |
| 5,024,494 | 6/1991 | Williams et al. | 359/1 |
| 5,042,909 | 8/1991 | Garcia, Jr. et al. | 359/478 |
| 5,082,350 | 1/1992 | Garcia et al. | 359/478 |
| 5,148,310 | 9/1992 | Batchko | 359/479 |
| 5,172,266 | 12/1992 | Garcia et al. | 359/478 |
| 5,220,452 | 6/1993 | Anderson | 359/462 |
| 5,231,538 | 7/1993 | Anderson | 359/462 |

*Primary Examiner*—Martin Lerner
*Attorney, Agent, or Firm*—René E. Grossman; Richard L. Donaldson

[57] ABSTRACT

A three dimensional display having a rotating screen, preferably helical in shape, a light source providing a beam of light and a holographic pattern deflecting the beam of light to predetermined points on the screen. The light is modulated, preferably by the holographic pattern. The holographic pattern rotates with the same angular velocity as the screen. The holographic pattern comprises a plurality of concentric circles, each of the circles comprising a plurality of cells, each of the cells representing a point on the screen.

11 Claims, 1 Drawing Sheet

SYSTEM AND METHOD FOR ROTATIONAL SCANNER BASED VOLUME DISPLAY

BACKGROUND OF THE INVENTION

1. Field of the Invention

This invention relates to a three dimensional display wherein the three dimensional image is generated from a diffractive element and, more specifically, a holographic scanner.

2. Brief Description of the Prior Art

Three dimensional display are known in the prior art. Such a display is created using a rotating display surface which receives light scanned or modulated in a two axis (x-y) area as set forth in U.S. Pat. No. 5,042,909, the contents of which are incorporated herein by reference. Such systems are known as multiplanar volume display systems. To implement such systems, the prior art utilized acousto/optic deflectors to achieve the x-y modulation or scanning. The fact that the prior art acousto/optic scanners have limited speed and are high in cost implies that a new approach is necessary wherein speed and/or cost can be reduced.

Rotational scanners, such as polygonal mirrors, hologons, etc., have been used for many years to generate x-y scan patterns for bar code readers, laser printers and many other optical devices. It has also been known in the prior art that a rotational scanner can produce an x-y scan pattern wherein a laser beam is transmissively or reflectively dispatched. Volume display images require specific addressing in the x-y plane at specific times in the cycle of the rotating display disk. These specific times are known as a time slice. For every time slice, a specific x-y plane must be scanned to created voxels of the volume (three dimensional) image.

SUMMARY OF THE INVENTION

In accordance with the present invention, there is provided a three dimensional display which meets the above-enumerated criteria and includes the combination of a diffractive element, preferably a rotational scanner, and a multiplanar rotating display disk to create a low cost volume three dimension display system and method.

Briefly, the scanning required by the prior art as illustrated above is achieved by use of a diffractive scanner, preferably but not limited to a holographic scanner. The system includes the holographic scanner in the form of a rotatable, preferably flat disk, rotated by a motor or other appropriate motive device, the disk having a predetermined hologram or holographic pattern thereon and being rotated about its axis. Light from one or more light sources, preferably one or more lasers, is transmitted through or reflected off of the rotating disk, preferably of glass or plastic with a hologram thereon. The transmitted or reflected light passes through projection optics which are used to make the deflection angle wider and are used to provide the proper mapping between the angularly distributed light beams from the scanner and the desired position on the display disk as well as to refocus the light beams so that the displayed points are well focussed. It should be understood that there are situations where the projection optics are not required. The light from the projection optics is then projected onto a rotating display disk, preferably but not necessarily in the form of a helix, the rotation of which is synchronized to that of the disk containing the hologram in well known manner, such as, for example, by being rotated on the same shaft as the disk containing the hologram, to create a voxel. Each light source can create plural voxels by being turned on and off at appropriate times. Also, if more than one light source is used, more than one voxel can be created simultaneously to provide multiple portions of a pattern for improved resolution or multiple patterns concurrently or multiple patterns consecutively to provide animation or the like.

The hologram on the disk includes a plurality of bands, each band having a plurality of elements or cells therein. Each element of the hologram has a predetermined diffraction pattern and provides to the beam impinging thereon one or more of a predetermined color, a predetermined transmission or reflection angle and a predetermined modulation or intensity level. Each cell of the hologram provides a particular point in the three dimensional pattern and each hologram is unique to a particular three dimensional pattern or image, so the hologram must be changed if a change of three dimensional image to be displayed is desired.

There is an analogy between the function of the scanner used in the present system and the acousto-optic scanner used in prior systems. The acousto-optic scanners are limited to displaying one point (voxel) at a time. The time slice or length of time each voxel is displayed is a trade-off between several conflicting requirements. In order to make interesting displays, it is desirable to have as many voxels as possible, however all of the voxels must be displayed in a given image in the time it takes the disk to rotate once. This is the frame time which must be shorter than the eye integration time to avoid flicker. In any case, the time slice should be very short to display as many voxels as possible. Conversely, the voxels appear to be less bright for shorter frame times since the eye has less time to integrate a fixed illumination level. Therefore it is desirable to have longer time slices for a brighter display. For the acousto-optic scanner, the time slice is further limited by the time it takes for the scanner to switch from one point to the next point. In general, a time slice is chosen close to this limit. The diffractive scanner represents each time slice with an individual cell, the cells forming a circumferential ring on the scanner disk. The minimum size of the cell then limits the number of time slices available. The minimum cell size may be determined by various considerations, such as the focussed beam size at the scanner, the angular resolution required from the scanner, or the difficulty of fabrication of small cells. Once the number of available time slices is determined, the software scheduler can parse the desired image and specify the deviation angle required from the scanner, whether it is acousto-optic or diffractive, in each time slice. For the acousto-optic scanners, the fixed input beam angle is translated into the desired output beam angle by specifying a voltage input to drive the scanner. For the diffractive scanner a specific diffractive pattern (grating) is calculated to perform the appropriate deviation in the beam. This pattern may be written on the scanner disk by a variety of means. A holographic exposure method is desirable because it requires a minimum of investment in equipment while assuring reasonable efficiency (most of the input energy comes out in the desired direction) over the desired range of deviation angles. This method is quite labor intensive, however.

The holographic scanner is fabricated by providing a transparent disk, preferably of glass or plastic, having a film thereon similar to photographic film which is standard holographic film with a pattern thereon and has high resolution. The film is particularly sensitive to the wave length of the light source due to the diffractive properties of the exposed film.

The result is a low cost approach which creates static volume images which can be turned on or off. Also, the bands of the hologram can be used to provide for simple animation or movement of the image in the display volume. Animation is achieved by sequentially displaying images stored as different bands or rings on the scanner. This is accomplished, for example, by having a series of light sources, each aligned with one ring, turn on sequential so that each band is displayed in turn. Alternatively, the bands can be arranged as a spiral so that a galvanometer or similar scanner can cause the beam from the light source to track from one image to the next as the disk rotates. Multiple bands can be illuminated at the same time to allow for multiple voxels to be displayed in each time slice, thereby achieving a more detailed image. Also, more complex patterns can be written in each cell to achieve the same result.

DESCRIPTION OF THE PREFERRED EMBODIMENT

Figure 1:
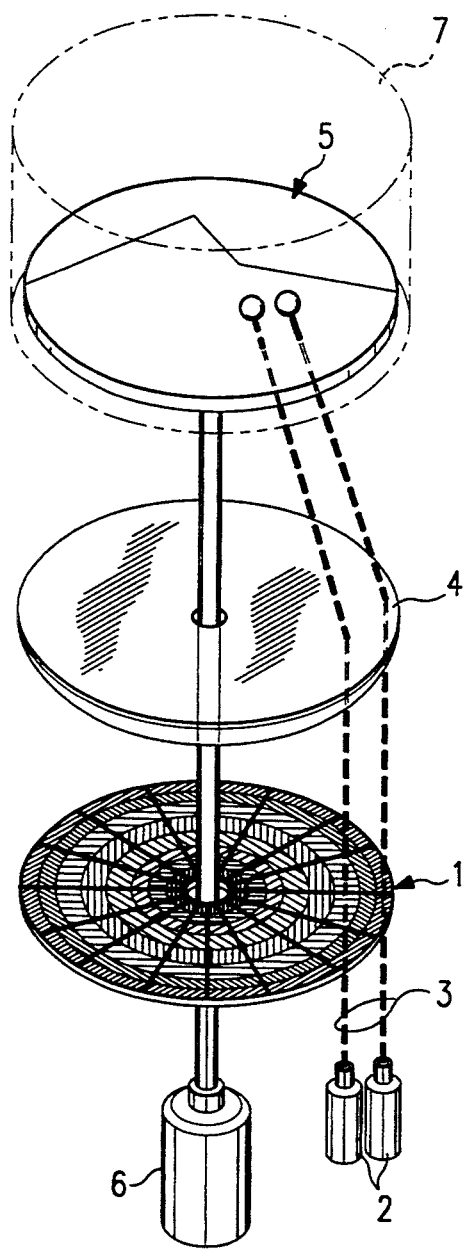
FIG. 1 is a schematic drawing of a system for a rotational scanner based volume display in accordance with the present invention.

Referring first to FIG. 1, there is shown a system in accordance with the present invention for providing a three dimensional display. The system includes a shaft 8 rotated by a motor 6. Secured to the shaft 6 and rotatable therewith are a holographic scanner 1 and a display disk 5 in the form of a helix as used in the prior art. The display disk 5 rests in a display volume 7 wherein the three dimensional display to be generated will be located. The three dimensional display is formed by projecting light from one or more light sources 2, preferably one or more laser diodes, with the light from the light source(s) being transmitted through the holographic pattern 1 and being modulated and deflected by the holographic pattern as well as being deflected by the projection optics 4 onto the rotating helical display disk 5. The result will be that a three dimensional image will be generated within the display volume 7 since the holographic scanner 1 replaces the scanner of the above noted patent.

Figure 2:
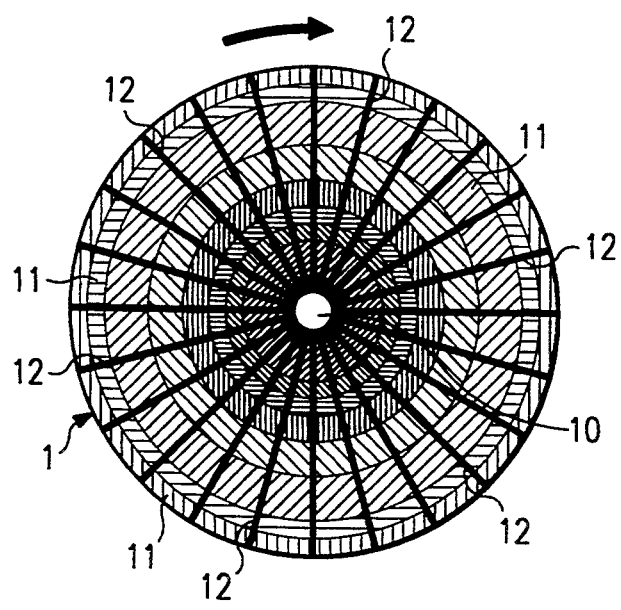
FIG. 2 is a top view of the holographic scanner as used in accordance with the present invention.

Referring now to FIG. 2, there is shown the holographic scanner 1 in accordance with the present invention which is a holographic pattern on a disk. The disk with pattern 1 includes a central aperture 10 through which the motor shaft 8 passes, the disk 1 being secured to the motor shaft. A plurality of concentric circular holographic tracks 11 are disposed on the disk 1 and are concentric with the aperture 10, seven such sections being shown in the preferred embodiment. Radii 12 are shown extending from the aperture 10 to the circumference of the holographic pattern, the space between a pair of such adjacent radii being referred to as a time slice.

Each ring or track 11 provides a single image. Many images are provided by having plural tracks, as shown in FIG. 2, with means to selectively illuminate each of the tracks, either sequentially to provide animation or on demand for individual images. Furthermore, a spiral track can be provided with the scanner travelling faster than the display disk to access plural rings for display of a single image and thereby have more voxels in the image.

The contents of the cells in each track are diffractive patterns which deviate the light beam into the appropriate directions as determined by the scheduler. With one voxel per time slice, as an example, the patterns are straight lines such as diffraction gratings. Each cell has a different pattern (or no pattern) depending upon the required voxel positions. The patterns vary as to line spacing (spatial frequency) and rotational orientation. More complex patterns are computed based upon the required voxel patterns determined by the scheduler. In general, each cell contains a different pattern since the angles required to produce the desired voxels vary from time slice to time slice.

In operation, the motor 6 will turn at some predetermined speed and rotate the scanner 1 and display disk 5 therewith (though it is not required that the scanner and disk travel at the same angular velocity). Light from each diode 2 will pass through one of the circles 11 of the holographic pattern (each light beam is shown passing through only one circle) and be modulated and/or take on a color (if required or desired) and/or be deflected and impinge upon the rotating display disk 5. Since the point of light impingement on the disk 5 is moving vertically in accordance with an harmonic motion since the preferred embodiment of the disk is in the shape of helix (though it can be flat or some other shape) and rotating, each point of light impinging upon the disk 5 will appear to the observer to create anywhere from a point to a vertical line, depending upon the content of the portion of the holographic pattern upon which the laser light impinges initially. Each holographic pattern will provide a single three dimensional image for a given number and positioning of the lights 2. Other three dimensional images can be provided using the same number and positioning of lights 2 by providing a different holographic pattern as the scanner 1.

Though the invention has been described with respect to a specific preferred embodiment thereof, many variations and modifications will immediately become apparent to those skilled in the art. It is therefor the intention that the appended claims be interpreted as broadly as possible in view of the prior art to include all such variations and modifications.

I claim:

1. A three dimensional display which comprises:
   (a) a rotating display screen in the shape of a helix;
   (b) a light source providing a beam of light; and
   (c) a diffractive pattern deflecting said beam of light to predetermined points on said display screen.

2. The display of claim 1 wherein said diffractive pattern is a holographic pattern.

3. The display of claim 2 wherein said holographic pattern rotates with the same angular velocity as said screen.

4. The display of claim 3 wherein said holographic pattern comprises a plurality of concentric circles, each of said circles comprising a plurality of cells, each of said cells representing a point on said screen.

5. The display of claim 2 wherein said holographic pattern comprises a plurality of concentric circles, each of said circles comprising a plurality of cells, each of said cells representing a point on said screen.

6. The display of claim 1 wherein said diffractive pattern rotates with the same angular velocity as said screen.

7. The display of claim 6 wherein said diffractive pattern comprises a plurality of concentric circles, each of said circles comprising a plurality of cells, each of said cells representing a point on said screen.

8. The display of claim 6 wherein said diffractive pattern comprises a plurality of concentric circles, each of said circles comprising a plurality of cells, each of said cells representing a point on said screen.

9. The display of claim 1 wherein said diffractive pattern comprises a plurality of concentric circles, each of said circles comprising a plurality of cells, each of said cells representing a point on said screen.

10. A three dimensional display which comprises:
    (a) a rotating display screen;
    (b) a light source providing a beam of light; and
    (c) a holographic pattern deflecting said beam of light to predetermined points on said display screen, said holographic pattern comprising a plurality of concentric circles, each of said circles comprising a plurality of cells, each of said cells representing a point on said screen.

11. The display of claim 10 wherein said holographic pattern rotates with the same angular velocity as said screen.

* * * * *